June 14, 1960   E. NAGY ET AL   2,941,103
ELECTROLUMINESCENT CELL AND METHOD OF MAKING SAME
Filed Jan. 8, 1957
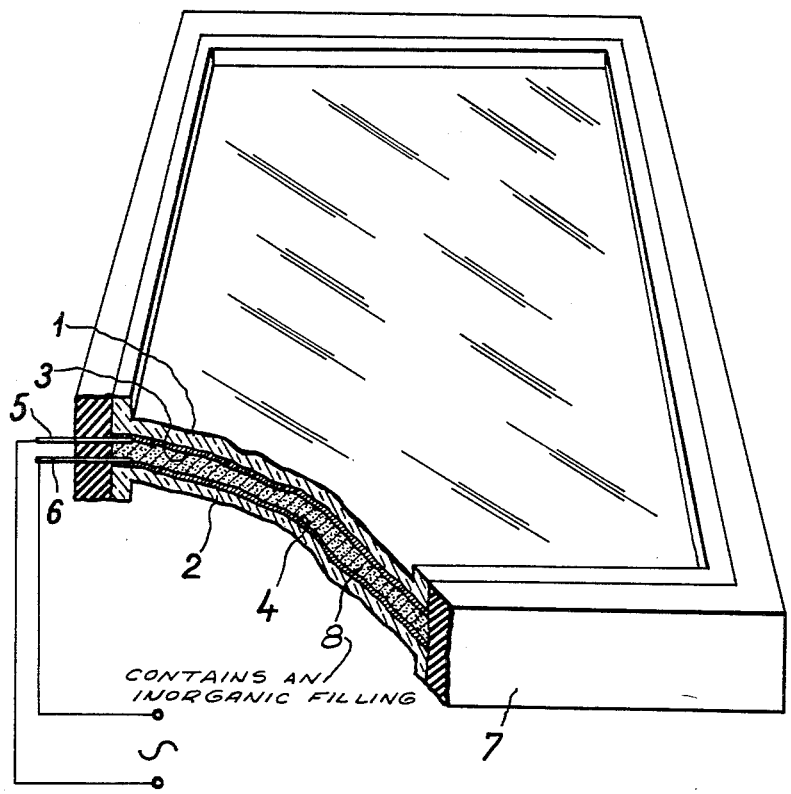
INVENTORS
ELEMÉR NAGY
JÁNOS SZABÓ
BY  Mock & Blum
ATTORNEYS

2,941,103

ELECTROLUMINESCENT CELL AND METHOD OF MAKING SAME

Elemer Nagy and Janos Szabo, Budapest, Hungary, assignors to Egyesult Izzolampa Es Villamossagi Reszvenytarsasag, Budapest, Hungary Filed Jan. 8, 1957, Ser. No. 633,121

11 Claims. (Cl. 313—108)

This invention relates to electroluminescent cells and methods of making them.

With known electroluminescent cells light is obtained by the application of voltage across a phosphor or by placing the phosphor in an electric field, the cells being most effective when used on alternating, pulsating or otherwise varying currents or fields. The phosphor is provided between two electrodes, at least one of which is a light transmitting or transparent layer of conducting material applied to an insulating substance such as e.g. glass. For the same purpose other conducting materials, such as the so called conductive glass, have also been proposed. The two insulating sheets together with the two conducting electrodes and the phosphor sandwiched in between the two electrodes form the electroluminescent cell.

As Destriau showed the quantity of light radiated by this kind of electroluminescent cells operated with A.C. of a given frequency rapidly increases with the electric field set up on the electroluminescent substance. It results therefrom that in order to attain high efficiency electroluminescent cells must be operated with great field strength. Since these cells are simply connected to the usual mains, i.e. to about 220 volts, a great field cannot be attained but with very thin electroluminescent layers.

The required field is practically always higher than the dielectric strength of the air (about 21 kv./cm. with an A.C.). Therefore the slightest remains of air must be removed from the cell. For this purpose the phosphor consisting of small pulverized particles is mixed with an organic binding material and then spread out into a thin, film-like layer and the electrodes applied to both sides of said layer.

Since the phosphor as usually applied is of the zinc sulphide type with a dielectric constant of at least 12 and even greater, whereby the dielectric constant of the binding material filling the interstices between said particles of the phosphor is generally lower, the voltage applied across the phosphor causes a greater stress in the binding material and a lower stress in the phosphor in dependence of said dielectric constants. Therefore, in order to attain the necessary field, either the usual mains voltage was insufficient, or the distance between the electrodes had to be shortened to such a degree that difficulties arose in the manufacture of an electroluminescent layer of the needed thickness. Thereby the danger of breakdowns between the electrodes was increased.

It is an object of the invention to provide an electroluminescent cell in which the foregoing defects are overcome.

Another object of the invention is to provide an electroluminescent cell adapted to be operated on the usual mains voltage, with economic lumen/watt values.

Still another object of the invention is to increase the light efficiency of electroluminescent cells.

The novel electroluminescent cell according to our invention comprises two electrodes, at least one of which made of a light transmitting material, a layer between said electrodes of a field-responsive phosphor embedded in a mixture of a binding material and an inorganic filling substance, said filling substance having a dielectric constant of at least 20 and a leakage constant (tangent $\delta$) not exceeding 0.2.

It has been found that in order to overcome the above said disadvantages the space between the electrodes is to be filled with a mixture containing a filling material of a substantially higher dielectric constant than that of the electroluminescent material. Moreover it has been found that a filling material consisting of granules the size of which is at least by an order of magnitude smaller than those of the electroluminescent powdered material fills the interstices between the granules of the electroluminescent material with a very high space factor. Thus the quantity of the organic binding material will be considerably less than required hitherto, and hence the electric field will be set up on the electroluminescent powder by a substantially greater part of the total voltage impressed upon the electrodes. Thus a quite smaller part of said voltage will drop on the binding material. Consequently only a small increase of the field will occur upon the binding material and since the quantity of this material has been decreased, in the end the voltage and thereby the field upon the granules of the phosphor will be increased. Owing to its high dielectric constant the potential difference across the filling material is practically negligible.

We prefer, however, to add an inorganic filling substance to the phosphor mixed with a binding material, the dielectric constant of said inorganic substance being at least 20, but preferably substantially higher, at least about 50 and having a leakage constant (tangent $\delta$) of at most 0.2.

The filling substance of this high dielectric constant is a finely powdered material the granules of which having a size smaller than that of the phosphor. Since the size of the granules of the phosphor is generally over 5 microns, the size of the granules of the filling substance is smaller than 5 microns and is preferably of about 1–2 microns or even less.

As an inorganic substance any one may be used which complies with the above said requirements and does not affect disadvantageously the operation of the cell. It has been found that titanium dioxide is well adapted to this purpose as well as generally oxides of the elements of group IV of the periodic system having a dielectric constant of at least 20, further compounds having the same property such as some of the titanates, zirconates, hafnates or niobates, especially alkaline earth titanates, alkaline earth zirconates, alkaline earth hafnates, alkaline earth niobates or mixtures of said substances with each other or with the respective oxides. Good results have been obtained for instance with barium titanate which has a high dielectric constant.

As a binding material we preferably use derivates of cellulose, such as nitrocellulose or the like, but various other materials may be used as described in our co-pending application Ser. No. 633,122, now abandoned, concerning an "Electroluminescent Cell and Method of Making Same." These materials contain in addition to collodion or artificial resins produced by condensation an artificial resin produced by polymerization such as a polyester.

The quantity of the filling material should be about 10% but at the most 200% by weight of the phosphor. Good results have been obtained by using 75% filling material. The quantity of the filling material to be used depends also upon the grain size of the substance.

As an electroluminescent material any known phosphor may be used. We prefer to use phosphors of the ZnS type.

The foregoing and other objects, features and advantages of the invention will be understood from the following detailed description referring to the accompanying drawing showing one embodiment of the invention and its scope will be pointed out in the appended claims. The figure of the drawing shows a perspective view, partly cut away, of a device according to the invention.

Plates 1 and 2 made of an insulating material such as glass or plastic are inside coated with conducting layers 3 and 4, respectively. At least one of the plates 1 and 2 and the conducting layer covering this plate are transparent or translucent in order to transmit light. The conducting layer may preferably be made of amorphous stannic oxide or cadmium oxide. It is within the purview of this invention, however, to utilize plates 1 and 2 made of a conducting material such as conducting glass in which case the conducting layers 3 and 4 may be dispensed with. One of the two plates 1 and 2 may also be made of an opaque material such as a metal as known in the art. The plates 1 and 2 are arranged in a frame 7 made of an insulating material. 5 and 6 are the lead-in wires. Light is emitted by the phosphor suspended in the dielectric layer 8 containing said phosphor, the binding substance and an inorganic filling substance of a dielectric constant of at least 20 and a dielectric loss (tangent $\delta$) of at most 0.2.

Thus the lighting layer may be the intimate mixture of a phosphor of the ZnS-type, of a binding material such as collodion and a filling substance, for instance barium titanate. The size of the granules of the ZnS phosphor may be of about 6–10 microns, the size of the granules of the barium titanate of about 0.3–1.0 micron. The ratio of the phosphor and the filling substance may be of about 4:3.

In order to produce an electroluminescent cell according to the invention a phosphor the granules of which have a size of about 8 microns for instance zinc sulphide, is intimately mixed with a powdered inorganic substance, such as barium titanate of a high dielectric constant and of grain size less than 5 microns added in a quantity referred to above. From this mixture and from a binding material and a solvent to which—if required—a softening agent and other organic substances may be added, a suspension is made and sprayed or otherwise brought up between the layers 3 and 4. The thickness of this layer 8 is of about 25–200 microns, for example 50 microns. It is allowed to dry by evaporating the solvent.

As a binding agent collodion may be used softened by dibutyl phthalate; but other agents such as a nitrocellulose lacquer or the like may also be used. The solvent may be butylacetate or any other usual solvent.

*Example 1*

100 g. ZnS phosphor (size of granules at the most 20 microns)
125 g. titanium dioxide (size of granules at the most 0.2 micron)
150 g. binding material, preferably nitrocellulose are intimately mixed with each other and with 10 l. of a solvent containing 150 g. softener. A layer 8 made of this suspension is sandwiched in between the conductive layers 3 and 4, the layer 8 having a thickness of about 25 microns.

*Example 2*

100 g. zinc cadmium sulphide phosphor (grain size of at most 30 microns)
80 g. filling material (a mixture of 50% barium titanate and 50% strontium titanate, size of grain 0.5–1.5 micron)
200 g. binding material, for example nitrocellulose are intimately mixed with each other, then 10 l. solvent containing 150 g. softener is added. The suspension thus prepared is sprayed onto one of the conducting coatings 3 or 4, the layer thus prepared having a thickness of about 55 microns.

*Example 3*

100 g. zinc suphoselenide phosphor (grain size up to 14 microns)
200 g. filling substance consisting of titanium dioxide, zircon dioxide and strontium titanate (grain size 0.3–1.1 micron)
220 g. binding material, for example nitrocellulose are intimately mixed together. A suspension is prepared as referred to in Examples 1 and 2 and a layer of a thickness of about 38 microns is sprayed in between the conducting coatings 3 and 4.

*Example 4*

100 g. zinc sulphide phosphor (grain size up to 37 microns)
50 g. filling substance consisting of 80% magnesium titanate and 20% barium zirconate (grain size 3–4 microns)
180 g. binding material are intimately mixed with each other, then a suspension is prepared as referred to in Examples 1 and 2. The layer 8 made of this suspension is of about 100 microns in thickness.

The electroluminescent cell made according to the invention can be readily mass produced and the final unit is easily handled and can be simply connected also to the usual mains of 110 or 220 volts for example. The light efficiency of the cell is fairly good as compared with known electroluminescent cells and the lumen/watt value is about 4–5 or even more at the same time the cell operating smoothly and free of breakdowns.

While we have indicated the preferred embodiment of our invention of which we are now aware and have also indicated only one specific application for which our invention may be employed, it will be apparent that our invention is by no means limited to the exact form illustrated and many variations may be made. Instead of using phosphors of the ZnS-type any other electroluminescent material may be used as well as any other filling and binding material without departing from the scope of our invention as set forth in the appended claims. The electrodes shown in the drawing form plates. In other embodiments of the invention the electrodes may have any other form.

We claim:

1. An electroluminescent cell having a layer capable of electroluminescence containing a binding material and a filler and placed between, and in intimate contact with two electrodes, one at least of which is substantially transparent and which both have a resistance of less than 1000 ohms per cm.$^2$, said layer containing in addition a finely granulated inorganic filling substance, also in the binding material, whose dielectric constant is at least 20, whose dielectric loss is not more than 0.2, whose weight represents between 10% and 200% of the weight of the phosphor present, and whose particle size is not greater than 5 microns.

2. An electroluminescent cell as claimed in claim 1, in which the finely granulated inorganic filling substance has a dielectric constant of about 50, a dielectric loss not more than 0.1 and a particle size not greater than 1 micron.

3. An electroluminescent cell according to claim 1, in which the ratio by weight of filling substance to phosphor is at least about 3:4.

4. An electroluminescent cell according to claim 1, in which at least part of the filling substance is an oxide of an element of group IV of the periodic table.

5. An electroluminescent cell according to claim 1, in which at least part of the filling substance is titanium oxide.

6. An electroluminescent cell according to claim 1, in which at least part of the filling substance is zirconium oxide.

7. An electroluminescent cell according to claim 1, in which the filling substance is at least partly selected from the group consisting of titanates, zirconates, hafnates, and niobates.

8. An electroluminescent cell according to claim 6, in which at least part of the filling is selected from the group consisting of alkaline earth titanates, zirconates, hafnates, and niobates.

9. An electroluminescent cell according to claim 1, in which the binding substance is at least partly nitrocellulose.

10. An electroluminescent cell according to claim 1, in which the binding material is a mixture of nitrocellulose and an artificial resin produced by condensation and an artificial resin produced by polymerisation.

11. An electroluminescent cell according to claim 1, in which the binding material is a mixture of an artificial resin produced by condensation and an artificial resin produced by polymerization.

References Cited in the file of this patent

UNITED STATES PATENTS

| | | |
|---|---|---|
| 2,624,857 | Mager | Jan. 6, 1953 |
| 2,728,731 | Butler et al. | Dec. 27, 1955 |
| 2,733,367 | Gillson | Jan. 31, 1956 |
| 2,765,419 | Roberts | Oct. 2, 1956 |
| 2,791,723 | Nagy et al. | May 7, 1957 |

FOREIGN PATENTS

| | | |
|---|---|---|
| 204,854 | Australia | May 26, 1955 |
| 764,867 | Great Britain | Jan. 2, 1957 |